United States Patent [19]

Matthews

[11] 4,028,800
[45] June 14, 1977

[54] CABLE SHAVING TOOL
[75] Inventor: James J. Matthews, East Haddam, Conn.
[73] Assignees: Utility Tools Corporation, Cromwell, Conn.;
[22] Filed: Oct. 2, 1975
[21] Appl. No.: 618,749
[52] U.S. Cl. .................. 30/90.1; 30/91.2; 81/9.5 R
[51] Int. Cl.² .................. B21F 13/00; B26B 27/00
[58] Field of Search .......... 30/90.1, 90.6, 90.7, 30/90.2, 90.3, 240, 264, 276, 91.2; 81/9.5 R, 9.5 C

[56] References Cited
UNITED STATES PATENTS

| 841,391 | 1/1907 | Hall | 145/3.2 |
|---|---|---|---|
| 3,204,495 | 9/1965 | Matthews | 81/9.5 R |
| 3,240,088 | 3/1966 | Samuels et al. | 82/4 |
| 3,354,762 | 11/1967 | Wolff | 81/9.5 R X |
| 3,398,610 | 8/1968 | Matthews | 81/9.5 C |
| 3,433,106 | 3/1969 | Matthews | 81/9.5 R |
| 3,839,791 | 10/1974 | Feamster | 30/97 |
| 3,852,882 | 12/1974 | Bettcher | 30/276 |

Primary Examiner—Al Lawrence Smith
Assistant Examiner—J. T. Zatarga
Attorney, Agent, or Firm—DeLio and Montgomery

[57] ABSTRACT

A cable shaving tool for removing the outer covering of a cable at a point intermediate its ends, comprising a sectional shaving head adapted to be closed around the cable, a drive shaft operatively connected to the blade support in the shaving head, and remote means for driving the drive shaft and for adjusting and controlling the position of the shaving head elements to permit applying the shaving head to the cable and removing it therefrom; also the method of removing the outer covering of a cable.

5 Claims, 9 Drawing Figures

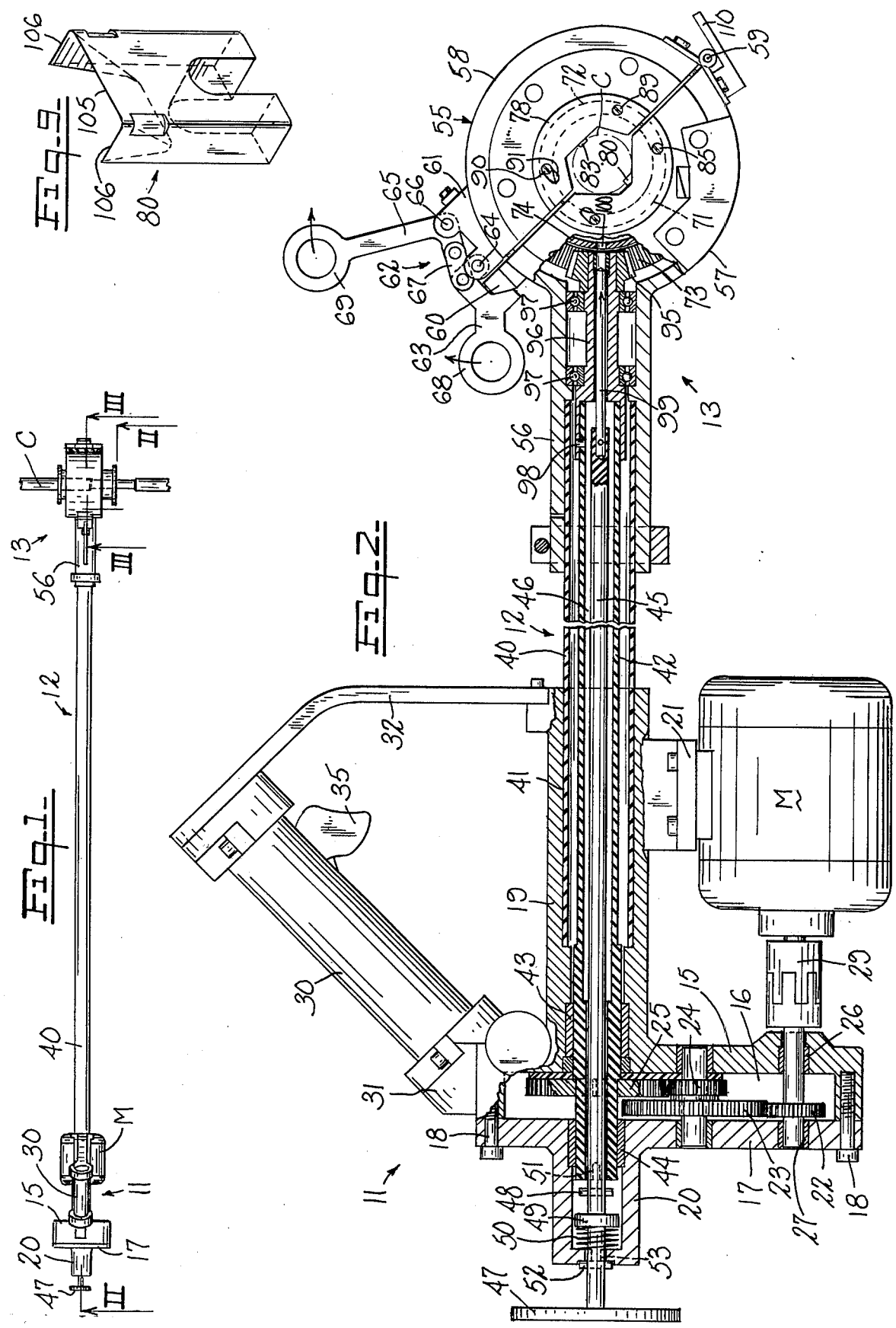

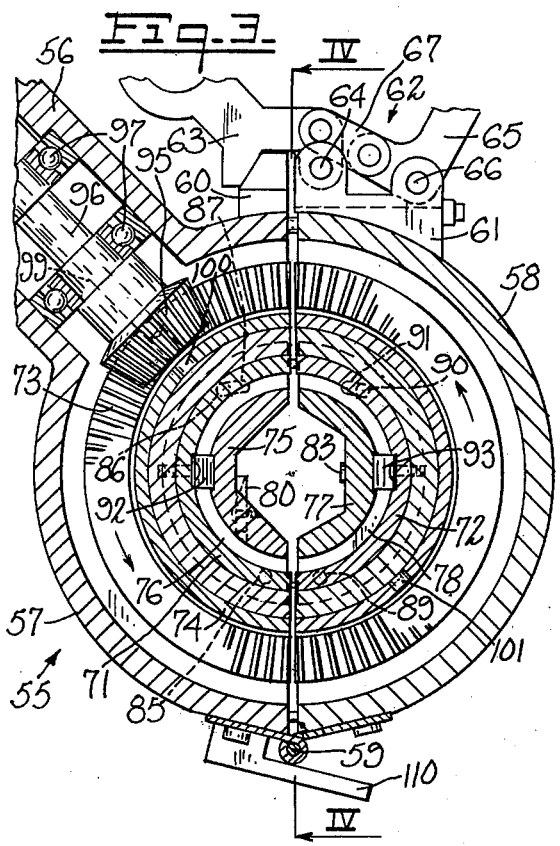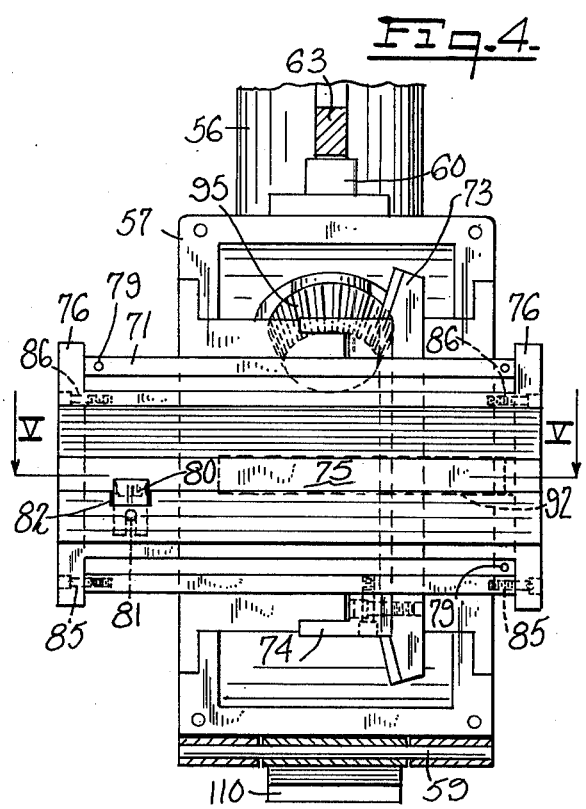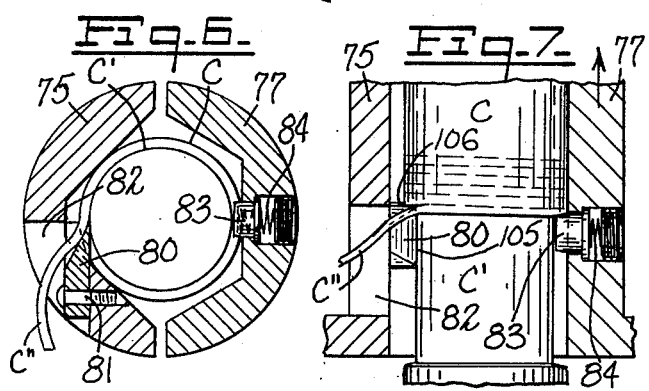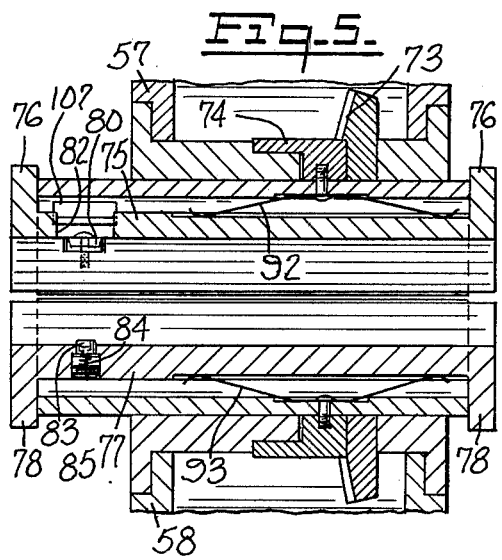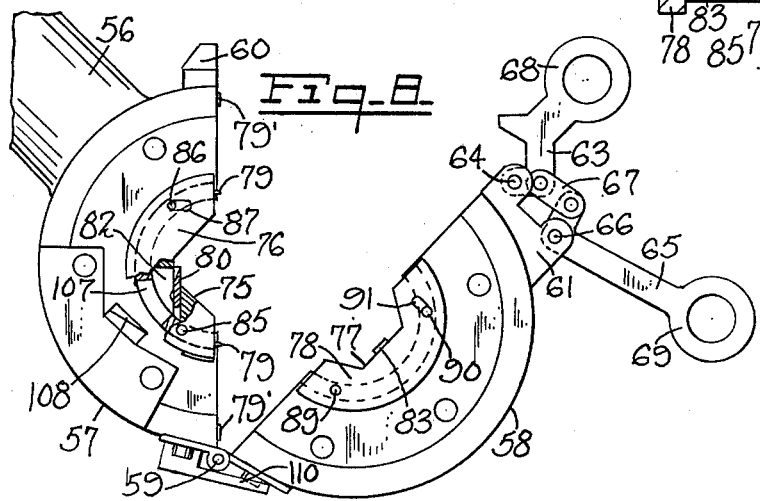

CABLE SHAVING TOOL

This invention relates to a cable shaving tool for removing the outer covering, and some insulation, from an electric cable or the like at a point intermediate its ends. The cables on which this tool is intended to operate are of the type having a tightly fitting or permanently bonded semi-conducting jacket over the insulation. It is the purpose of this tool to remove such jacket at some point other than a cable end; in order to be certain that all of the semi-conducting jacket is removed, a small amount of the underlying insulation is also shaved off. The term "shaving " refers to the removal of a portion only of the cable covering, without exposing the conductor, in contrast to "stripping" wherein all the insulation is removed. The present tool is a shaver, not a stripper.

Tools are known for removing, in the form of a helical strip the protective and/or insulating covering adjacent to a free end of an electric cable, as a step toward exposing the conductor or conductors for splicing, attachment to a terminal or other purposes. Such shaving tools include simple manually rotated devices and more sophisticated shavers adapted to be motor driven. There is frequently, a need, however, to remove the semi-conductive jacket from a cable at a point remote from its ends, while providing a smooth finish on the insulation and preferably or necessarily without interrupting service at all or with minimal interruption, as for splicing in a connection to an additional service location. One such device, designed particularly for operation on overhead cables, is shown in applicant's prior U.S. Pat. No. 3,204,495, wherein the tool is applied to a cable by means of the shotgun arm of a long lineman's pole and is rotated, 180° at a time, by means of a second pole provided with a hook. The present invention is concerned primarily (although not exclusively) with the shaving of cable which is buried so as to require excavation of the soil to expose it. Shaving the insulation off from a live electric cable by means of a hand-held tool is obviously a dangerous operation, even with the best available local protection such as gloves and blankets.

It is an object of the present invention to provide a cable shaving tool adapted for operation on a mid-point of an electric cable.

It is a further object of the invention to provide a shaving tool wherein the shaving head on the cable is actuated from a remote point through non-conductive elements.

It is another object of the invention to provide a shaving tool wherein the shaving head on the cable is sectional and adapted to be closed around the cable area to be shaved, locked in place and eventually removed, by simple manipulation from a remote point.

It is a still further object of the invention to provide a shaving tool of the character described which is readily portable, easy to manipulate and operate and requires only a power source which can readily be provided.

It is yet another object of the invention to provide a method of "mid-span" shaving of energized electric cables with maximum safety and convenience and minimum interruption of service.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

The tool comprises a sectional shaving head with hinged segments adapted to be closed around the cable, a blade support and blade in the shaving head, a drive shaft operatively connected to the blade support, a remote drive for the drive shaft, and remotely controlled means for adjusting and controlling the position of the shaving head elements to permit applying the shaving head to the cable and removing it therefrom. The invention includes the method of removing the outer covering of a cable by a remotely controlled shaving device.

Cables to be shaved by the tool of this invention may be accessible from a variety of directions, i.e., horizontally if the cable is supported above ground level, or more or less vertically if the cable is buried or overhead. The drawings show the tool, arbitrarily, as extending in a horizontal plane (FIGS. 1 and 2) or angled downward (FIGS. 3, 4 and 8), and the description assumes the maintenance of attitudes in that range, with the understanding that all other attitudes are possible, depending on the location and attitude of the cable area to be shaved.

A practical embodiment of the invention is shown in the accompanying drawings, wherein:

FIG. 1 represents a top plan view of the tool, in operative position on a cable;

FIG. 2 represents a longitudinal vertical section, on the line II—II of FIG. 1, parts being broken away;

FIG. 3 represents a vertical section on the line III—III of FIG. 1, parts being broken away;

FIG. 4 represents a vertical section on the line IV—IV of FIG. 3;

FIG. 5 represents a detail horizontal section of the line V—V of FIG. 4;

FIG. 6 represents a detail vertical section through the blade support, blade and cable, in shaving position;

FIG. 7 represents a detail horizontal section, showing the same parts as FIG. 6;

FIG. 8 represents a detail side elevation of the shaving head in open position; and FIG. 9 is an isometric projection of the shaving head blade.

Referring to the drawings, the tool comprises the power source and control assembly 11, the shaft element assembly 12 and the shaving head assembly 13.

The assembly 11 includes a two-part housing having a main portion 15 containing a chamber 16 which is closed by a cover 17, bolted to the main portion by bolts 18. The main portion has an integral tubular extension 19 and the cover is formed with a closed tubular extension 20 coaxial with the extension 19. A motor mounting bracket 21 on the extension 19 supports a motor M which is connected through the clutch or coupling 29 to a train of reducing gears 22, 23, 24, 25 in the chamber 16 and journaled in bushings 26 and 27. A carrying and operating handle 30 is fixed to the main housing portion by means of a fitting 31 and bracket 32, the handle being disposed at an angle of about 45° to the axis of the extension 19, for convenience in manipulating the tool. A trigger-type switch handle 35 is mounted in the handle for operating a switch (not shown) to turn the motor current on and off. The motor may suitably be of low H.P. and adapted to run on current from a portable source.

The shaft elements include the main shaft 40 which is tubular with one end fixed, at 41, within the extension 19 of the main housing. A second tubular shaft 42 is the drive shaft, rotatable in bushings 43 in the housing 15 and 44 in the cover 17, the gear 25 being keyed to the shaft 42 at a point within the chamber 16 between the bushings 43 and 44. The third element of the shaft assembly is the shaver locking rod 45, slidable in the bore 46 of the shaft 42 and extending outward through the end of extension 20, where it is provided with a handle or knob 47. The rod 45 is traversed by an inner pin 48 and carries a stop ring 49, both within the extension 20, and a spring 50 between the end of the extension and the stop ring biases the rod toward a position such that the pin 48 may engage in slots 51 in the end of tubular shaft 42, for a purpose explained below.

A second pin 52 traverses the rod 45 at a point outside the end of the extension 20 and is adapted to pass through a slot 53 when the rod is turned to a selected angular position.

The shaving head assembly 13 includes a drum-shaped housing 55 with an integral tubular stem portion 56, the housing being split diametrically on a plane lying at about at 45° angle to the axis of the extension, into complementary sections 57 and 58, hinged together at 59. Opposite the hinge, the section 57 is provided with a locking lug 60 and the section 58 is provided with a base 61 for the toggle lock 62. The lock comprises a bifurcated leg 63 pivoted in the base 61 at 64 with its other end in a position to engage the locking lug 60, a bell crank 65 pivoted in the base 61 to 66 and connected at one end to the leg 63 by a link 67. The leg 63 and bell crank 65 are provided with actuating arms terminating in the rings 68, 69, respectively, for remote actuation of the lock. The linkage is so arranged that, with the lock parts in the position of FIGS. 2 and 3, the leg 63 cannot be turned to release the lug 60 because the link 67 is aligned with the pivot 66. Unlocking requires movement of the rings 69 and 68 in a clockwise direction, as indicated by the arrows in FIG. 2.

The active elements in the shaving head include a cylindrical shaver drive tube 71, 72 split on a diametrical plane, a bevel gear 73 and gear mounting ring 74, both also split on the same plane, and attached to the tube sections, a shaver support bar 75 adapted to fit within one half of the drive tube 71 and having end flanges 76 which bear against the ends of the drive tube, and a back-up plug support bar 77, complementary to the shaver support bar, fitting in the other half 72 of the drive tube and having end flanges 78 bearing against the ends of said other half of the drive tube. Proper spacing of the divided parts 57–58 and 71–72, 73 and 74, in the closed position, is assured by the provision of small lugs 79 and 79' on the parts 57 and 71. An angular shaving blade 80 is held by the screw 81 in an opening 82 in the shaver support bar 75 with its edges projecting inward in cutting position. A back-up plug 83 is mounted in the bar 77 at a position opposite the blade 80, the plug being urged radially inward by a spring 84 for a purpose to be explained below. The shaver support bar is connected to its half of the drive tube 71 by a screw 85 passing through the flange 76 and into one end of the tube in a manner to permit a slight pivoting movement, and a second screw 86 adjacent the opposite edge of the support bar extends through a short slot 87 in the flange 76 to limit the relative movement of the support bar and drive tube. Similarly, the back-up plug support bar 77 is pivotally conected to the drive tube portion 72 by a pivot screw 89 passing through the flange 78 and into the end of the portion 72, with a movement-limiting screw 90 in a short slot 91 adjacent the opposite edge of the bar 77.

The respective support bars 75, 77 are urged radially inward, around pivots 85 and 89, by leaf springs 92, 93 between the support bars and their respective drive tube portions.

The power transmission mechanism includes a bevel gear 95 on a gear shaft 96 which is journaled in bearings 97 within the stem portion 56 of the shaving head housing, the shaft 96 being fixed on the lower end of the drive shaft 42 as by a rivet or key 98. The gear 95 meshes with the gear 73, the split halves of which fit together, when the shaver head housing is closed, to act as a single continous gear.

The gear shaft 96 is bored to accomodate a locking pin 99, fixed in the lower end of the rod 45 and movable axially to be retracted in, or projected from, the center of the gear 95. The gear mounting ring 74 is provided with a radially disposed hole 100 in a position such that it is opposite the pin 99 when the parts are in the position shown in FIGS. 2, 3, 4 and 8, and a hole 101 may also be provided in the other half of ring 74 at a diametrically opposite point.

The shaving blade 80 is shown in FIG. 9 as having an angular cutting edge comprising the axial edge 105 and radial edges 106, since it must start its cutting action on the outer wall of an insulated cable by forming an axial cut and two circumferential cuts to dig out a circumferential groove. Thereafter the cut progresses spirally to the left, as viewed by the operator, using only the axial edge and one radial edge of the blade.

In operation, assuming the shaving head housing to be closed and locked with its contents in a random orientation, the rod 45 is turned by the knob 47 to enable the pin 52 to pass through the slot 53, and the pin 48 is engaged in the slots 51 of the shaft 52 (the drive shaft). If one of the holes 100, 101 happens to be in alignment with the locking pin 99, the gear 73 and associated parts will be locked in the proper position for opening the shaving head and no adjustment is necessary. However, if the holes 100, 101 are not aligned with the pin 99 it is necessary to drive the gears manually by turning the knob 47 on the rod 45 and drive shaft 52 until a hole is brought into locking position. The pin 99 is urged into hole-engaging position by the spring 50 and the slots 51 are long enough to permit the pin 98 to slide axially as needed.

With the shaving head elements positioned in the respective halves of the housing, the lock 60–69 is unlocked and the head is opened to the position shown in FIG. 8, such opening being limited by the stop 110 on the hinge 59. The opened head is manipulated, by the remote handle 30, into operating position adjacent a cable C to be shaved, which may be in an excavation in the ground or elsewhere, the lock actuating rings 68, 69 are engaged by an operating pole or the like to close and lock the shaving head around the cable (FIG. 2) and the locked bevel gear is released by pulling the pin 99 out of the hole 100 or 101 by means of the knob 47, the pin 99 being held out of engagement with the holes by rotating the knob so that the outer pin 52 rest against the end of the extension 20. In this position the inner pin 48 is disengaged from the slots 51 and the drive shaft 42 is free to be driven by the motor, as desired, to rotate the shaver drive tube section 71, 72, the shaver support bar 75 (with shaving blade 80) and the back-up plug support bar 77.

At the beginning of the shaving operation the back-up plug 83 is depressed, by the cable, into its support bar against the force of spring 84 and the blade edge 105 rests against the surface of the cable. Upon rotation of the blade around the cable a flat, relatively wide, piece of insulation is peeled off and discharged from the shaving head through an opening 107 adjacent the blade. After about 180° rotation the plug 83 drops onto a shaved surface C' of the cable, adjacent to a radial unshaved edge and serves as a guide while the tool is moved along the cable to remove a narrower helical strip C" of insulation for any desired distance, e.g., a few inches or more, as illustrated in FIG. 7. The side of the plug 83 which contacts the radial edge surface of the insulation (FIG. 7) is off-set axially with respect to the forward cutting edge 106 of the blade 80 by a distance which determines the width of the strip C". In its guiding and stabilizing function the plug 83 cooperates with the blade edge 105 to produce a smooth finish along the surface C' of the underlying insulation. The removed strip is cut into short sections, as it exits through the opening 80, by a blade 108 fixed on the housing 57.

Since this tool is designed to operate on live cables, with little or no interruption of service, it is essential that the shaft elements 40, 42, and 45 be of non-conductive material such as a glass fiber and plastic compound. As an order of magnitude the shaft elements may conveniently be about 4 feet (1.22 M.) in length giving the tool an over-all length of 6 feet (1.52 M.); these dimensions are not critical and can be varied to suit any special requirements.

The shaving tool is shown as including a small electric motor as the prime mover; it is evident that the device shaft could readily be arranged for rotation by a hand crank as a substitute for the motor or as an optional expedient in a situation where an electric source is not available.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What I claim is:

1. A cable shaving tool comprising a shaving head having a fixed portion and a relatively rotatable portion, a shaving blade mounted on the rotatable portion and rotatable therewith, means for rotating the rotatable portion which means includes gears in the shaving head and remotely located means for driving said gears, the rotatable portion including one of said gears, the shaving head and at least one gear being split on a diametrical plane, the parts being hinged together, and a releasable lock being provided to bolt together the hinged parts, means retaining the split gear portions in operative relation to the split shaving head portion, whereby the shaving head is adapted to be applied in open position to a cable to be shaved and closed around said cable with the shaving blade and gears in operative position.

2. A cable shaving tool according to claim 1 which includes means for locking the split gear in a position such that the split plane of the gear coincides with the split plane of the shaving head.

3. A cable shaving tool according to claim 1 which includes a power source and control assembly, and a shaft element assembly connecting the power source and control assembly to the shaving head, the shaft element assembly comprising a first tubular shift fixed at one end to the power source and control assembly and at the other end to the shaving head, a second tubular shaft within the first tubular shaft connected at one end to the power source and at the other end to the blade rotating means, and a third shaft movable axially in the second shaft and provided with releasable means for locking the blade rotating means in a selected rotary position.

4. A cable shaving tool comprising a shaving tool having a fixed portion and a relatively rotatable portion, a shaving blade mounted on the rotatable portion and rotatable therewith, means for rotating the rotatable portion which means includes gears in the shaving head and remotely located means for driving said gears, the rotatable portion including one of said gears and a blade support bar, the blade being fixed on said bar and said bar being mounted for limited pivotal movement relative to one of said gears, and resiliently mounted means in the shaving head in a position to bias a cable toward the shaving blade, the shaving head being sectional and adapted to be applied in open position to a cable to be shaved and closed around said cable with the shaving blade in operative position.

5. A cable shaving tool according to claim 4 wherein the resiliently mounted means includes a spring actuated plug adapted to bear against the cable outer surface during one revolution of the blade and against at least one cut surface thereafter.

* * * * *

UNITED STATES PATENT AND TRADEMARK OFFICE
CERTIFICATE OF CORRECTION

PATENT NO. : 4,028,800
DATED : June 14, 1977
INVENTOR(S) : James J. Matthews

It is certified that error appears in the above-identified patent and that said Letters Patent are hereby corrected as shown below:

On the Title page, the Assignee should read --Utility Tool Corporation--.

Column 1, line 26, after "frequently", delete the comma.

Column 2, line 45, after "shaving", delete "head".

Column 3, line 65, "barextends" should read --bar extends--.

Column 4, line 64, "rest" should read --rests--.

Column 6, line 1 of claim 4, "shaving tool" (second occurrence) should read --shaving head--.

Signed and Sealed this

Eleventh Day of October 1977

[SEAL]

Attest:

RUTH C. MASON
Attesting Officer

LUTRELLE F. PARKER
Acting Commissioner of Patents and Trademarks